No. 874,590. PATENTED DEC. 24, 1907.
T. A. HENDRICK.
WHIFFLETREE TRACE FASTENER.
APPLICATION FILED MAY 17, 1907.
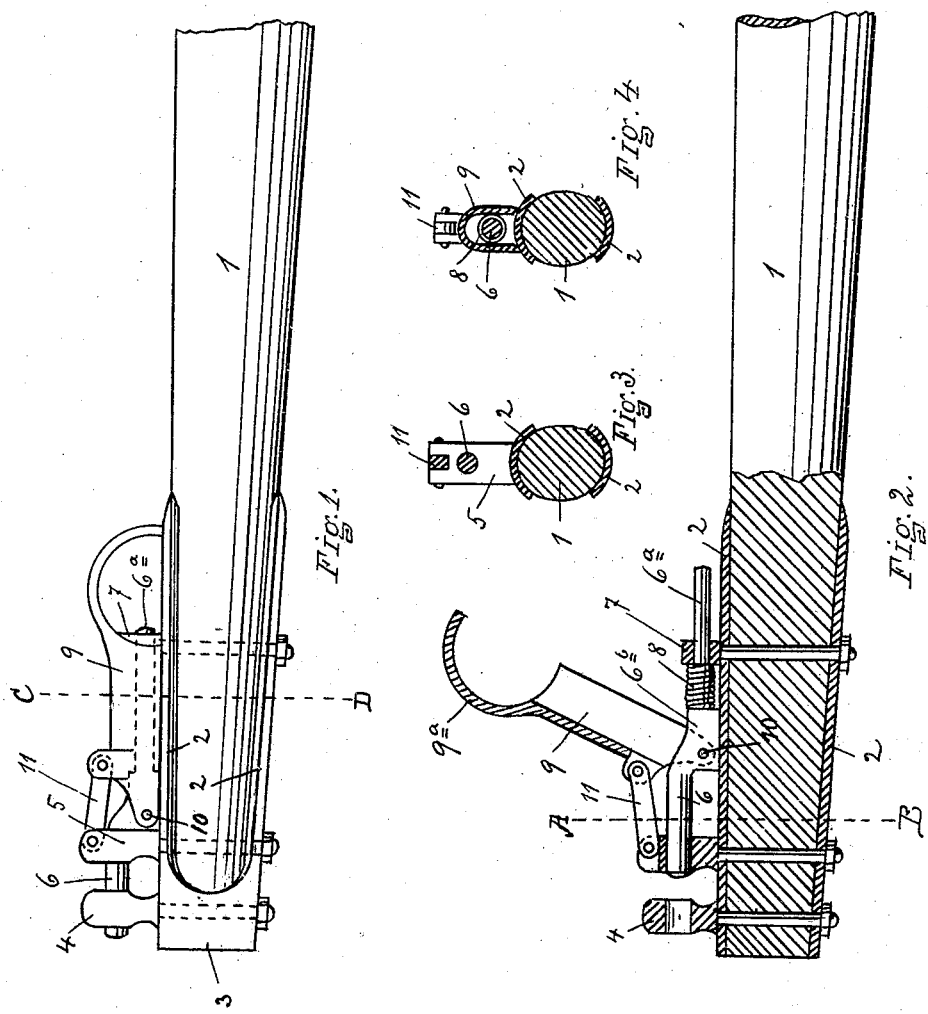
WITNESSES.
Rich. A. George
Sarah E. Clark.
INVENTOR
THOMAS A. HENDRICK
BY Robinson, Martin & Jones
ATTORNEYS.
THE NORRIS PETERS CO., WASHINGTON, D. C.

UNITED STATES PATENT OFFICE.

THOMAS A. HENDRICK, OF SAUQUOIT, NEW YORK, ASSIGNOR, BY DIRECT AND MESNE ASSIGNMENTS, TO J. R. FRETZ, OF SAUQUOIT, NEW YORK, AND FLORENCE L. ROGERS, OF WARRINGTON, PENNSYLVANIA.

WHIFFLETREE TRACE-FASTENER.

No. 874,590.  Specification of Letters Patent.  Patented Dec. 24, 1907.

Application filed May 17, 1907. Serial No. 374,159.

*To all whom it may concern:*

Be it known that I, THOMAS A. HENDRICK, of Sauquoit, in the county of Oneida, and State of New York, have invented certain new and useful Improvements in Whiffletree Trace-Fasteners, and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide an improved whiffle tree hitch or trace fastener, which is simple in construction, compact and unobjectionable for use and capable of being released even while there is heavy strain on the trace.

Figure 1 shows a top or plan view of my improved trace fastener in closed position in connection with a section or portion of a whiffle tree on which it is mounted. Fig. 2 shows a longtiudinal section of the same with the fastener in open position. Fig. 3 is a cross section taken on line A—B of Fig. 2. Fig. 4 is a cross section taken on line C—D of Fig. 1.

Referring to the reference letters and figures in a more particular description, 1 indicates a whiffle tree on the end of which is preferably provided protecting straps or housings 2, 2 which may be in two parts or a single piece united in an encircling ring 3 at one end. To the end of the whiffle tree is applied two eye bolt projections 4, 5 spaced somewhat apart to receive the end of the trace therebetween and having openings or eyes located in line or coinciding. These eyes or openings receive the reciprocating bolt 6, which bolt is extended inwardly in a stem or shank 6ª which slides freely through the eye or opening of a suitable stand or projection 7. Between the stand 7 and the shoulder enlargement 6ᵇ of the bolt is introduced a spring 8 coiled about the shank 6ª and tensioned to impel the bolt towards its closed or locking position.

A lever 9 is provided pivoted at 10 to the bolt and connected with the top of the projection or bolt 5 by a connecting rod 11, which is pivotally secured to the top of said projection and the top of the lever 9 at its ends respectively. The lever 9 in its body is made of a general U-shaped form in cross section to provide a housing for the major portion of the bolt and spring when in closed position and is also provided with a loop 9ª substantially of semi-circular form by means of which the lever may be readily grasped for operation. The free end of the lever 9 including the loop 9ª is arranged to strike or come in engagement with the strap 2 when in closed position, as well shown in Fig. 1 whereby all objectionable projections or corners are eliminated and the device in its closed position is not liable to injure the draft animals if they should accidentally or otherwise come in contact with same.

The operation of the spring 8 is not only to project the bolt across the trace-receiving space but also to hold the lever 9 in closed position. It will be noted that the arrangement of the pivotal points of the lever 9 is such that a large amount of leverage is available for withdrawing the bolt—sufficient to enable it to be withdrawn with heavy tension on the trace and under any circumstances which might require the trace to be released under such conditions.

It is evident that modifications and changes in and from the construction herein shown and described may be made without departing from the invention stated by the claims.

What I claim as new and desire to secure by Letters Patent is:

1. In a trace fastener, the combination of a reciprocating bolt adapted to be projected across a trace-receiving space therein and supported in eyes at either side of said space, a spring adapted to move the bolt to its position spanning said space, a lever for releasing the bolt and arranged to form a housing for the bolt when in closed position, substantially as set forth.

2. The combination in a trace fastener of a reciprocating bolt, a trace-receiving space across which the bolt is adapted to be projected, eyes at either side of said space receiving the bolt, a spring arranged to move the bolt to closed position and mounted on a stem or shank of the bolt, a lever for operating the bolt arranged to provide a housing for the shank or stem of the bolt and spring, substantially as set forth.

3. The combination in a whiffle tree fastener of a reciprocating bolt, a trace-receiving space across which the bolt is adapted to be projected and having eyes at either side of said space to receive the bolt, a spring for operating the bolt to closed position mounted on an inwardly extending stem portion of the bolt, a bolt operating lever pivoted at one end to the bolt and connected by a link with a fixed portion of the fastener and arranged to provide a housing for the spring and stem portion of the bolt, substantially as set forth.

In witness whereof, I have affixed my signature, in presence of two witnesses, this 11th day of May, 1907.

THOS. A. HENDRICK.

Witnesses:
 GEO. E. RENDELL,
 SARAH E. CLARK.